United States Patent [19]

Namiki

[11] Patent Number: 4,497,067
[45] Date of Patent: Jan. 29, 1985

[54] INTERFERENCE CANCELLATION TYPE SPACE DIVERSITY SYSTEM

[75] Inventor: Junji Namiki, Tokyo, Japan

[73] Assignee: NEC Corporation, Tokyo, Japan

[21] Appl. No.: 512,705

[22] Filed: Jul. 11, 1983

[30] Foreign Application Priority Data

Jul. 14, 1982 [JP] Japan .................................. 57-122715

[51] Int. Cl.³ ............................................... H04B 7/08
[52] U.S. Cl. ...................................... 455/273; 455/139; 455/276; 455/278; 375/100; 375/101
[58] Field of Search ................... 455/52, 65, 138, 139, 455/273, 276, 278, 296; 375/40, 100, 101

[56] References Cited

U.S. PATENT DOCUMENTS 4,326,294  4/1982  Okamoto et al. ..................... 455/273
4,384,366  5/1983  Kaitsuka ............................... 455/139
4,397,036  8/1983  Hirade et al. ........................... 375/40

FOREIGN PATENT DOCUMENTS 92931  6/1982  Japan ..................................... 455/273

Primary Examiner—Jin F. Ng
Attorney, Agent, or Firm—Laff, Whitesel, Conte & Saret

[57] ABSTRACT

An interference cancellation type space diversity system transmits digital microwaves in a sure and stable manner. Signals coming in through two spaced antennas are combined together into a single input signal and the composite signal is processed by a demodulator into a baseband signal which is identical with a transmitted signal. The demodulated baseband signal is processed by a frequency/amplitude characteristic detector network, which comprises a correlation circuit and an identification circuit, thereby controlling output phases of the antennas.

1 Claim, 6 Drawing Figures

INTERFERENCE CANCELLATION TYPE SPACE DIVERSITY SYSTEM

BACKGROUND OF THE INVENTION

The present invention relates to a space diversity system for the transmission of digital microwaves.

In space diversity systems heretofore proposed, composite outputs are provided either by a method relying on inphase combination or a method relying on switching. Of the two known methods, the former is predominant today because the latter is unsuitable for digital transmission systems due to a phase difference between two antenna outputs which would cause switching to bring discontinuity into phases.

Recently, digital high capacity transmission with high stability as typified by 16 QAM (Quadrature Amplitude Modulation) has been put to practical use. In parallel with this trend, the role initially assigned to the space diversity system for insuring receive signal levels is being replaced by a new role for removing interference waves, which create distortions in direct waves. The interference cancellation type space diversity system implements the demand for the new role. A radio receiving apparatus using such a system is disclosed in U.S. Pat. No. 4,326,294 issued Apr. 20 1982. This prior art apparatus, however, leaves a problem unsolved that the use of level detectors 20, 22 and 24 having bandpass filters (see FIG. 6) make the whole apparatus bulky.

SUMMARY OF THE INVENTION

It is therefore an object of the present invention to provide an interference cancellation type space diversity system which eliminates the problem inherent in the prior art system described.

It is another object of the present invention to provide an interference cancellation type space diversity system which offers characteristics excellent enough to realize sure and stable transmission of digital microwaves.

It is another object of the present invention to provide an interference cancellation type space diversity system including a frequency/amplitude characteristic detector which eliminates the need for level detectors with bandpass filters and still attains their function using a demodulated baseband signal.

It is another object of the present invention to provide an interference cancellation type space diversity system which is simple in construction and small size.

It is another object of the present invention to provide a generally improved interference cancellation type space diversity system.

An interference cancellation type space diversity system for receiving signals coming in through two spaced antennas and for combining the input signals into a single signal of the present invention includes a phase shifter for controlling output phases of the antennas, a comparator for comparing intensities of the signals individually received by the antennas, and a demodulator for receiving a combined output of the antennas. A correlator produces at least one correlation between an output of the demodulator and a plurality of signals obtained by processing the output of the demodulator.

The correlation circuit processes an output of the demodulator to produce at least one of correlations $C(-T)$ and $C(+T)$ between at least one of a difference $E(t)$ between a demodulated complex sample value $S(t)$ and a complex decision result $\hat{S}(t)$ thereof at a time t and a sign of the difference $E(t)$, and two variables belonging to any one of three sets of values which are demodulated complex sample values $S(t-T)$ at a time $(t-T)$ and a complex sample value $S(t+T)$ at a time $(t+T)$, complex decision results $\hat{S}(t-T)$ and $\hat{S}(t+T)$ thereof, and complex signs $\text{Sign}(\hat{S}(t-T))$ and $\text{Sign}(\hat{S}(t+T))$ thereof. An identification circuit identifies a sign of an imaginary part of at least one of the correlations $C(-T)$ and $C(+T)$. A controller is provided for controlling a phase in the phase shifter in response to the comparison result of the comparator and the identification circuit.

In accordance with the present invention, an interference wave cancellation type space diversity system transmits digital microwaves in a sure and stable manner. Signals coming in through two spaced antennas are combined together into a single signal and the resultant signal is processed by a demodulator into a baseband signal which is ideally identical with a signal transmitted from a transmitter. The demodulated baseband signal is processed by a frequency/amplitude characteristic detector, which comprises a correlation circuit and an identification circuit, thereby controlling output phases of the antennas.

The above and other objects, features and advantages of the present invention will become apparent from the following detailed description taken with the accompanying drawings.

DESCRIPTION OF THE PREFERRED EMBODIMENT

While the interference cancellation type space diversity system of the present invention is susceptible of numerous physical embodiments, depending upon the environment and requirements of use, a substantial number of the herein shown and described embodiment have been made, tested and used, and all have performed in an eminently satisfactory manner.

Bandpass type Fourier spectrum $F(\omega)$ has a center frequency $\omega_o$ and a generally asymmetrical time waveform which is expressed by a time function $f(t)=f_e(t)\cos\omega_o t - f_o(t)\sin\omega_o t$, where $f_e(t)$ is an impulse response of an equivalent low-pass filter for a symmetrical component in $F(\omega)$, and $f_o(t)$ is an impulse response of an equivalent low-pass filter for an odd symmetrical component in $F(\omega)$. It follows that in the intersymbol interference originating from the asymmetry of the Fourier spectrum $F(\omega)$, an orthogonal component has dependence on the configuration of an odd symmetrical component.

Figure 1A:
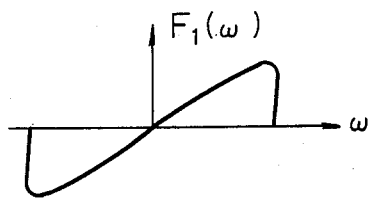
FIGS. 1a–1d are diagrams showing principles of the present invention.
Figure 1C:
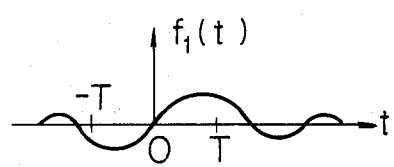
Figure 1B:
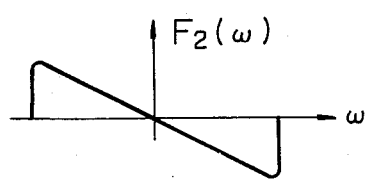
Figure 1D:
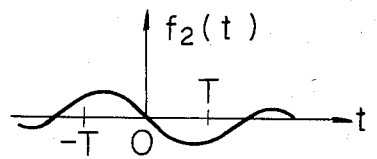

FIGS. 1a and 1b respectively show odd symmetrical Fourier spectrums $F_1(\omega)$ and $F_2(\omega)$ having opposite inclinations, while FIGS. 1c and 1d show time waveforms $f_1(t)$ and $f_2(t)$ particular thereto. One of the waveforms $F_1(t)$ and $f_2(t)$ is a time reversed version of the other with respect to time $t=0$. Therefore, the polarities given by the resulting intersymbol interference to the preceding and succeeding received signals are a combination of negative and positive in the case of the waveform $f_1(t)$ and a combination of positive and negative in the case of the waveform $f_2(t)$, as opposed to the waveform $f_1(t)$.

It is inducible from the above analysis that detecting a polarity of an orthogonal component in the intersymbol interference allows an inclination direction of an odd symmetrical component to be presumed.

Suppose a digital waveform which varies its value in every T seconds and has complex sample values of $\hat{S}(t-T)$, $\hat{S}(t)$ and $\hat{S}(t+T)$ at times $t-T$, $t$ and $t+T$ respectively, and their decision results, $S(t-T)$, $S(t)$ and $S(t+T)$. Then, the intersymbol interference $I(\pm T)$ exerted by the preceding and succeeding signals $S(t-T)$ and $S(t+T)$ on $S(t)$ is obtainable as a mean value with respect to time of $S^*(t\pm T)\{S(t)-\hat{S}(t)\}$, $\hat{S}^*(t\pm T)\{S(t)-\hat{S}(t)\}$, Sign $\{S^*(t\pm T)\}\cdot\{S(t)-\hat{S}(t)\}$, $\hat{S}^*(t\pm T)$ Sign $\{S(t)-S(t)\}$, $S^*(t\pm T)$ Sign $\{\hat{S}(t)-S(t)\}$ or Sign $\{S^*(t\pm T)\}\cdot$ Sign$\{S(t)-\hat{S}(t)\}$. Let it be understood that when $Z=a+jb$, Sign $(z)=$Sign $(a)+j\cdot$Sign $(b)$ and that the symbol "$\pm$" before each "T" should be read in the same order with the others. The orthogonal component $I_I$ of intersymbol interference is produced by $$I_I = Im\{I(-T)\} - Im\{I(+T)\}$$

where Im $\{x\}$ means a imaginary part of complex signal x.

While the use of at least one of $I(-T)$ and $I(+T)$ suffices in producing the orthogonal component $I_I$, it will be a safer measure to use both of them against complicate distortions actually occur.

Figure 2:
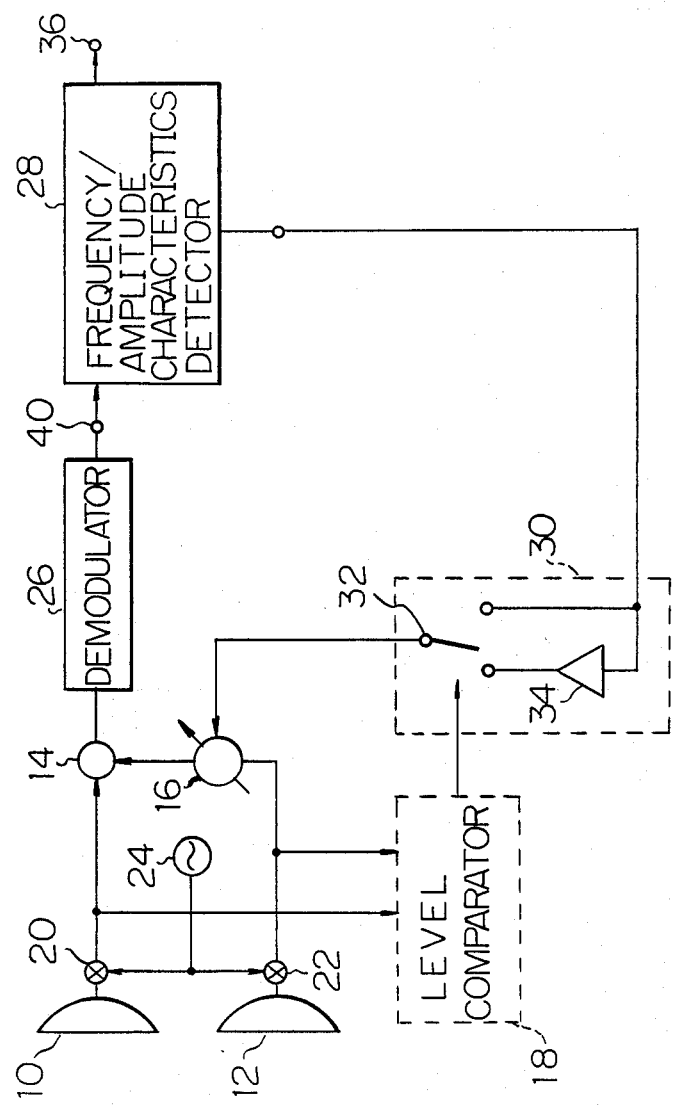
FIG. 2 is a block diagram of an interference wave cancellation type space diversity system embodying the present invention.

Referring to FIG. 2, a space diversity system embodying the present invention is shown. The system includes antennas 10 and 12, a combining circuit 14, a phase shifter 16, a level comparator 18, mixers 20 and 22, and an oscillator 24, which are constructed each in the manner described in the previously mentioned U.S. Pat. No. 4,326,294. The combined output of the antennas 10 and 12 are fed to a demodulator 26 to be demodulated thereby. The output of the demodulator 26 is a baseband signal identical with one which was sent out from a remote transmitter, i.e., four outputs $(1+j)$, $(1-j)$, $(-1+j)$ and $(-1-j)$ concerning the 4-phase shift keying (PSK) system, for example. If noise is superposed on the received signal, the output signal of the demodulator 26 will of course be accompanied by the noise. The block generally designated by the reference numeral 28 is a frequency/amplitude characteristic detector network which comprises a correlation circuit and an identification circuit, as will be described later in detail. Another block included in the system, generally 30, is a polarity switching circuit adapted to reverse the control direction in response to an output of the level comparator 18. This function of the circuit 30 is implemented by a switch 32 operable in response to a polarity of an output signal of the comparator 18 and an inverter 34 for inverting a polarity of a signal input thereinto. The identified output of the demodulator 26 appears at a terminal 36.

Figure 3:
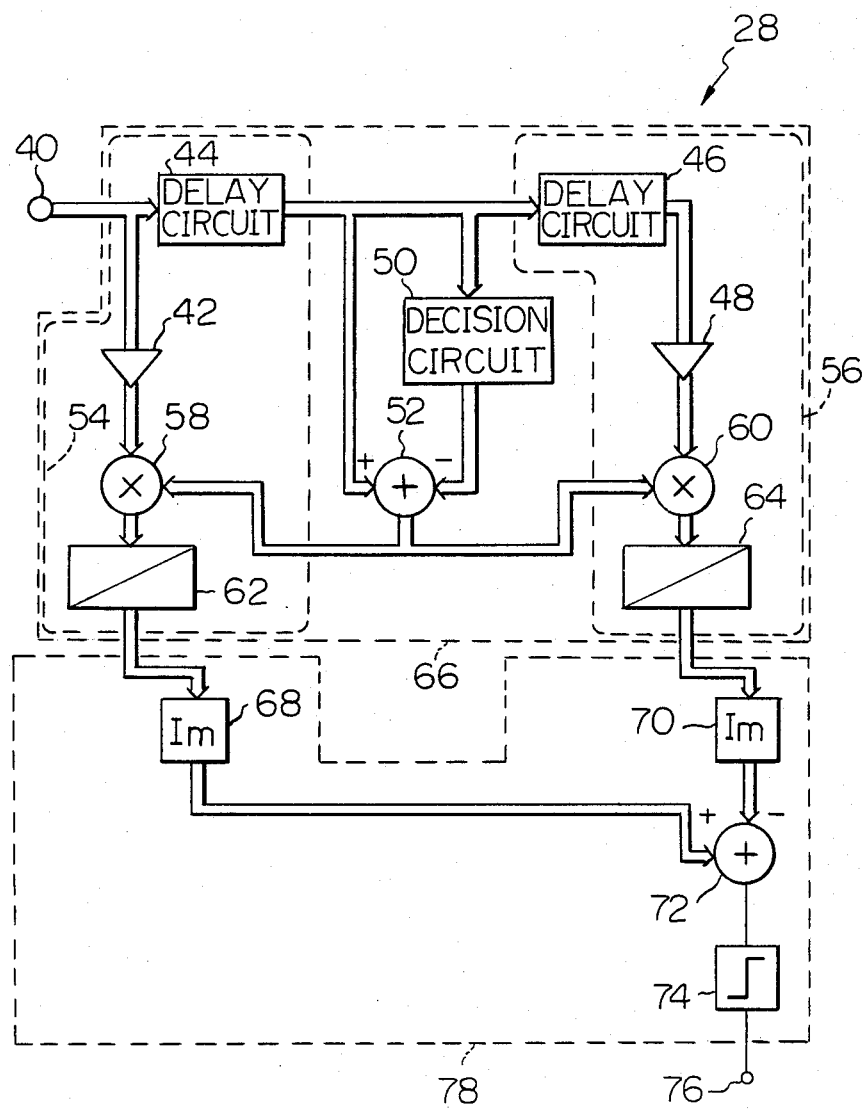
FIG. 3 is a block diagram showing details of a frequency/amplitude characteristic detector included in the system of FIG. 2.

Details of the frequency/amplitude characteristic detector network 28 are shown in FIG. 3. The detector 28 has an input terminal 40 at which arrives a complex sample value $\hat{S}(t-T)$ made up of a real part and an imaginary part. The signal at the terminal 40 is delivered to an inverter 42 which then inverts a sign of the imaginary part only and thereby produces a complex conjugate sample value $S^*(t-T)$. The signal from the terminal 40 is also delivered to a second inverter 48 via T-second delay circuits 44 and 46 so that a complex conjugate sample value $S^*(t+T)$ is produced from the inverter 48. A decision circuit 50 and a complex adder 52 cooperate to produce a difference $E(t)$ between a complex sample value $S(t)$ and a decision result thereof $\hat{S}(t)$. The output of the decision circuit 50 constitutes a regular discriminated output of the demodulator 26. The difference $E(t)$ is fed to a complex multiplier 58 of a block 54 and a complex multiplier 60 of a block 56, each being adapted to produce $f(a+jb)\times(c+jd)=(ac-bd)+j(ad+bc)$. The output of the complex multiplier 58 is fed to a digital low-pass filter 62 the output of which represents a correlation $C(-T)$ between $S^*(t-T)$ and $E(t)$. Likewise, the output of the complex multiplier 60 is fed to a digital low-pass filter 64 the output of which represents a correlation $C(+T)$ between $S^*(t+T)$ and $E(t)$. Therefore, the block generally designated by the reference numeral 66 serves as a correlation circuit which produces the correlations $C(-T)$ and $C(+T)$. Each of the correlation signals $C(-T)$ and $C(+T)$ is a complex signal consisting of a real part and an imaginary part. Branch circuits 68 and 70 individually pick up the imaginary parts out of the complex signals fed thereto. The two imaginary parts $Im\cdot C(-T)$ and $Im\cdot C(+T)$ are processed by an adder 72 to provide a balance therebetween. This balance is equivalent to the previously mentioned orthogonal component $I_I$. The orthogonal component $I_I$ is fed to a threshold circuit 74 which produces Sign$(x)=1$ (where $x>1$) or Sign$(x)=-1$ (where $x\leq 0$), that is identifies the sign of the input, positive or negative. The output Sign $(I_I)$ of the threshold circuit 74 is delivered to a terminal 76 to control an equalizer. It will be understood, therefore, that the block designated by 78 functions as an identification circuit for determining whether the imaginary parts of the correlations $C(-T)$ and $C(+T)$ are positive or negative. If desired, the outputs of the T-second delays 44 and 46 may respectively be $\hat{S}(t-T)$ and $\hat{S}(t+T)$ or Sign $\{\hat{S}(t-T)\}$ and Sign $\{(t+T)\}$. Then, a decision circuit similar to the circuit 50 will be coupled to the output of each T-second delay with or without a threshold circuit similar to the circuit 74 coupled to the output of the additional decision circuit in order to obtain the outputs concerned.

Additionally, the difference $E(t)$ may be replaced by Sign $\{E(t)\}$ in which case the threshold circuit 74 will be directly connected to the output of a complex adder 52.

Various modifications will become possible for those skilled in the art after receiving the teachings of the present dislosure without departing from the scope thereof.

What is claimed is:

1. An interference cancellation type space diversity system for receiving signals coming in through two spaced antennas and a combiner means for combining the input signals into a single signal, said system comprising:

phase shifter means for controlling the output phase of one of the antennas;

comparator means for comparing intensities of the signals individually received by the antennas;

demodulator means for getting baseband signals from a combined output of the antennas;

correlator means for producing at least one correlation between an output of the demodulator means and a plurality of signals obtained by processing said output of the demodulator means;

identification means for identifying a sign of an imaginary part of at least one of the correlations; and means for controlling a phase in the phase shifter means in response to the comparison result of the comparator means and the identification means.

* * * * *